(12) United States Patent
Després

(10) Patent No.: US 8,297,383 B2
(45) Date of Patent: Oct. 30, 2012

(54) ENDLESS TRACK SUSPENSION

(76) Inventor: Jean Després, St. Antonin (CA)

( * ) Notice: Subject to any disclaimer, the term of this patent is extended or adjusted under 35 U.S.C. 154(b) by 188 days.

(21) Appl. No.: 12/752,177

(22) Filed: Apr. 1, 2010

(65) Prior Publication Data

US 2010/0253138 A1   Oct. 7, 2010

Related U.S. Application Data

(63) Continuation-in-part of application No. 11/746,082, filed on May 9, 2007, now Pat. No. 7,708,092.

(30) Foreign Application Priority Data

Jul. 12, 2006   (CA) ..................................... 2552119

(51) Int. Cl.
    *B62D 55/00*    (2006.01)
(52) U.S. Cl. ........... 180/9.5; 180/9.1; 305/120; 305/131
(58) Field of Classification Search ............... 180/9.1, 180/9.21, 9.48, 9.5, 9.52, 9.54, 9.56, 9.58, 180/9.6, 9.62; 305/120, 131, 132, 134, 135
    See application file for complete search history.

(56) References Cited

U.S. PATENT DOCUMENTS

| | | |
|---|---|---|
| 3,860,080 A | 1/1975 | Firstenberg |
| 5,273,126 A | 12/1993 | Reed et al. |
| 5,388,656 A | 2/1995 | Lagasse |
| 5,622,234 A | 4/1997 | Nagorcka et al. |
| 6,006,847 A | 12/1999 | Knight |
| 6,318,484 B2 | 11/2001 | Lykken et al. |
| 6,557,953 B1 | 5/2003 | Kahle et al. |
| 6,615,939 B1 | 9/2003 | Karales et al. |
| 6,926,105 B2 | 8/2005 | Brazier |
| 7,296,862 B2 | 11/2007 | Albright et al. |

FOREIGN PATENT DOCUMENTS

| | | |
|---|---|---|
| CA | 2214474 | 3/1998 |
| JP | 2004148872 | 5/2004 |

OTHER PUBLICATIONS

International Search Report, PCT/CA2007/001271, Oct. 19, 2007.

*Primary Examiner* — Lesley D Morris
*Assistant Examiner* — Marc Scharich
(74) *Attorney, Agent, or Firm* — Norton Rose Canada LLP

(57) ABSTRACT

An endless track suspension is comprised of a suspension support beam having an idler wheel assembly connected to a respective one of opposed ends thereof. At least one of the idler wheel assemblies has an endless track binding mechanism. Support wheels are secured to the suspension support beam and project from a lower face thereof. A drive sprocket is secured elevated above the suspension support beam by a support arm. The drive sprocket is secured to a vehicle drive axle by a coupling ring. The drive sprocket, the support wheels and idler wheels constitute an endless track support assembly for supporting an endless track in drivable engagement thereabout. A flexible connection of the drive sprocket support arm and the support wheels absorbs shocks and vibrations transmitted to the vehicle drive axle by the displacement of the endless track over a rough ground surface.

19 Claims, 5 Drawing Sheets

ENDLESS TRACK SUSPENSION

CROSS-REFERENCE TO RELATED APPLICATION(S)

The present application is a continuation in part of U.S. patent application Ser. No. 11/746,082, filed on May 9, 2007 now U.S. Pat. No. 7,708,092, and claims priority on Canadian Patent Application No. 2,552,119, filed on Jul. 12, 2006, by the present applicant.

TECHNICAL FIELD

The present invention relates to an endless track suspension and particularly, but not exclusively, for use with all-terrain vehicles.

BACKGROUND ART

Specifically, the endless track structure of the present invention is of the type wherein a suspension support beam is provided with idler wheels at opposed ends thereof with one of the wheels being adjustable to tension an endless track. A drive sprocket is connected to the support beam and adapted to connect to the drive axle of a vehicle whereby to impart rotation to the endless track supported about the idler wheels and the drive sprocket. Generally, this type of endless track structure is known in the art as disclosed, for example, by U.S. Pat. Nos. 6,318,484, 6,006,847 and 5,388,656. However, known prior art structures do not provide the flexibility, shock-damping features and adjustability that is required when such endless track structures are used on all-terrain vehicles where the vehicle is displaced at high speed over hard, rough terrain or snow. They also require many parts in their assembly and this leads to frequent break-downs and repairs. Some of these structures also use leaf-spring structures for shock absorption, therefore contributing to a heavy suspension assembly.

SUMMARY OF INVENTION

It is a feature of the present invention to provide an endless track suspension which substantially overcomes the above-mentioned disadvantages of the prior art.

Another feature of the present invention is to provide an endless track suspension assembly which is comprised of few component parts and which provides for a smooth shock-absorbing ride of a vehicle equipped with such endless track suspension.

Another feature of the present invention is to provide an endless track suspension which is easy to assemble and disassemble and which provides ease of adjustment for the tensioning of the endless belt.

Another feature of the present invention is to provide an endless track suspension wherein the drive sprocket is supported by a side arm which is secured to the support beam by a torsion pivot connection to provide shock damping.

Another feature of the present invention is to provide an endless track suspension wherein the support wheels secured to the suspension support beam are secured by a torsion connection to provide shock damping.

Another feature of the present invention is to provide an endless track suspension wherein an adjustable idler wheel is biased by an adjustable tensioning spring mechanism which is easily adjustable.

Another feature of the present invention is to provide a drive sprocket coupling having an adaptor ring whereby the drive sprocket may be secured to different types of drive shaft connections.

According to the above features, from a broad aspect, the present invention provides an endless track suspension having a suspension support beam provided with idler wheel assemblies at respective one of opposed ends of the support beam. At least one of the idler wheel assemblies has an endless track binding means. Support wheels are secured to the suspension support beam and project from a lower face of the support beam. A drive sprocket is secured elevated above the suspension support beam by a support means. Coupling means is connectable to the drive sprocket for securing same to a vehicle drive axle. The drive sprocket, the support wheels and idler wheels constitute an endless track support assembly for supporting an endless track in drivable engagement thereabout. Flexible suspension means is provided to absorb shocks and vibrations transmitted to the vehicle drive axle by the displacement of the endless track over a rough ground surface.

According to the present disclosure, there is provided

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
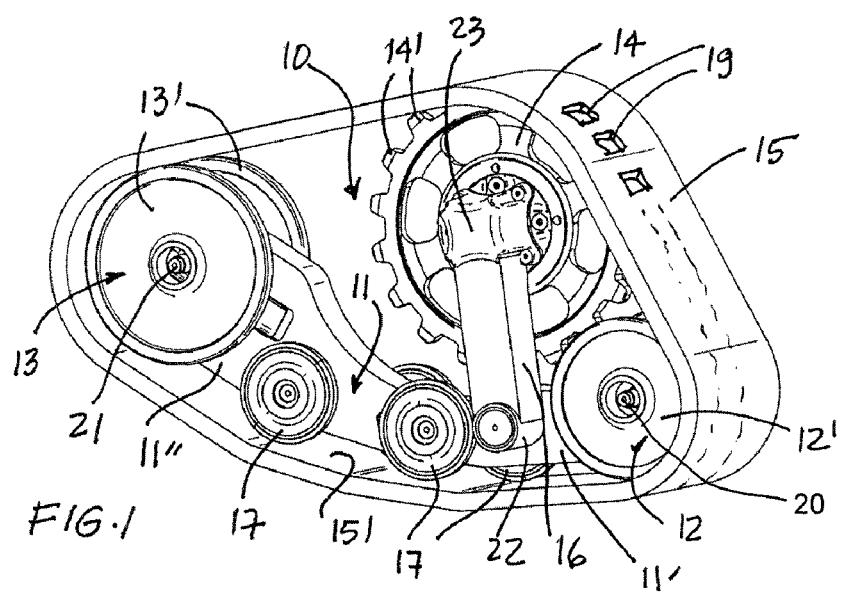
FIG. 1 is a perspective view showing the endless track suspension of the present invention supporting thereabout and in drivable engagement an endless track.

Referring now to the drawings and more particularly to FIG. 1, there is shown generally at 10 the endless track suspension of the present invention. It is comprised of a suspension support beam 11 having an idler wheel assembly 12 and 13 at opposed ends 11' and 11" of the suspension support beam 11. The idler wheel assembly 13 is a track binding idler wheel and as will be described later it provides a binding spring force against the inner surface 15' of an endless track 15 trained over a portion thereof.

The endless track suspension further comprises a drive sprocket 14 secured at an elevated position above the suspension support beam 11 by support means, herein a support arm 16. A plurality of support wheels 17 are secured to the suspension support beam 11 and project from a lower face 18 thereof. These support wheels 17 are provided on opposed sides of the support beam 11. As hereinshown there are two support wheels 17 on each side of the support beam. As also hereinshown the drive sprocket 14 is provided with sprocket teeth 14' which are in engagement with sprocket receiving holes 19 provided all along a central longitudinal axis of the endless track 15. Each idler wheel assembly 12 and 13 is comprised of a pair of wheels 12' and 13' each pair of wheels is supported on an axle 20 and 21, respectively. The support arm is also secured to the suspension support beam 11 by a torsion pivot connection 22. The upper end of the support arm is secured to a connecting shaft of a cap secured to the drive sprocket, as will be described, later and a cover 23 shields this connection from outside elements.

Figure 2:
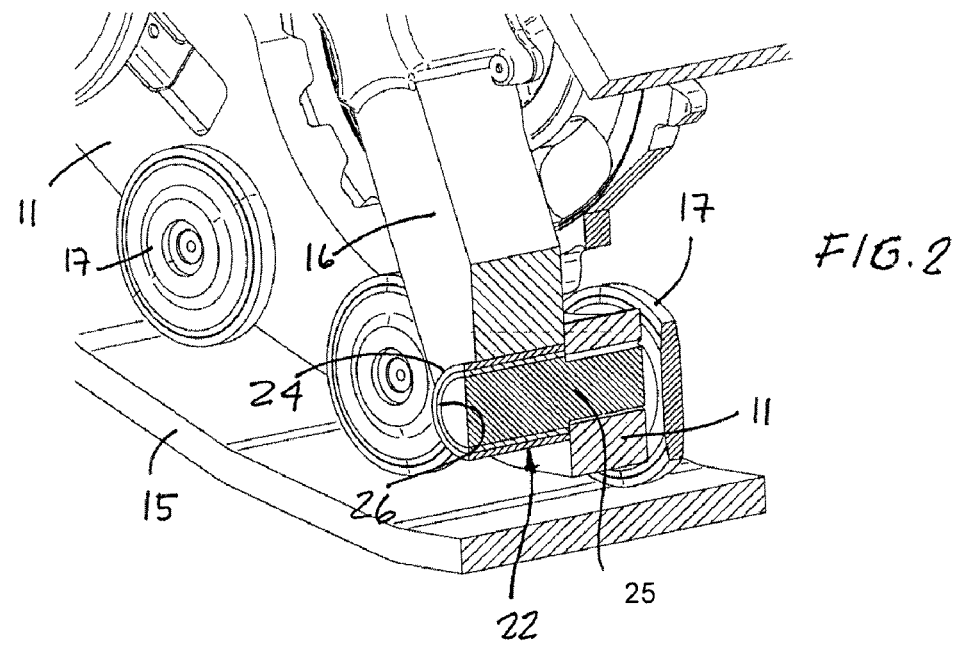
FIG. 2 is a fragmented and partly section view illustrating the torsion pivot connection of the drive sprocket support arm.

Referring now to FIG. 2, there is shown the construction of the torsion pivot connection 22 and it is comprised by a connecting transverse hollow metal sleeve 24 secured to the lower end of the support arm 16 by suitable means such as welding or press-fit connection. A connecting metal shaft or rod 25 is immovably secured at one end in a connecting bore found in the support beam 11. A rubber sleeve 26 is vulcanized about a projecting end portion 25' of the connecting metal rod 25. The projecting end portion 25' extends into the transverse hollow metal sleeve 24 secured to the lower end of the support arm 16 with the rubber sleeve 26 vulcanized with the hollow metal sleeve. This rubber sleeve 26 provides limited torsional displacement of the connection of a support arm about the connecting rod 25.

Alternatively, any appropriate spring may be provided between the support beam 11 and the support arm 16, to return the support beam 11 to a desired orientation of the support arm 16 after pivoting of one with respect to another by the pivot connection 22. For instance, coil springs or leaf springs having opposed ends on the beam 11 and the arm 16 may dampen the movement of the support beam 11 with respect to the support arm 16.

Figure 3:
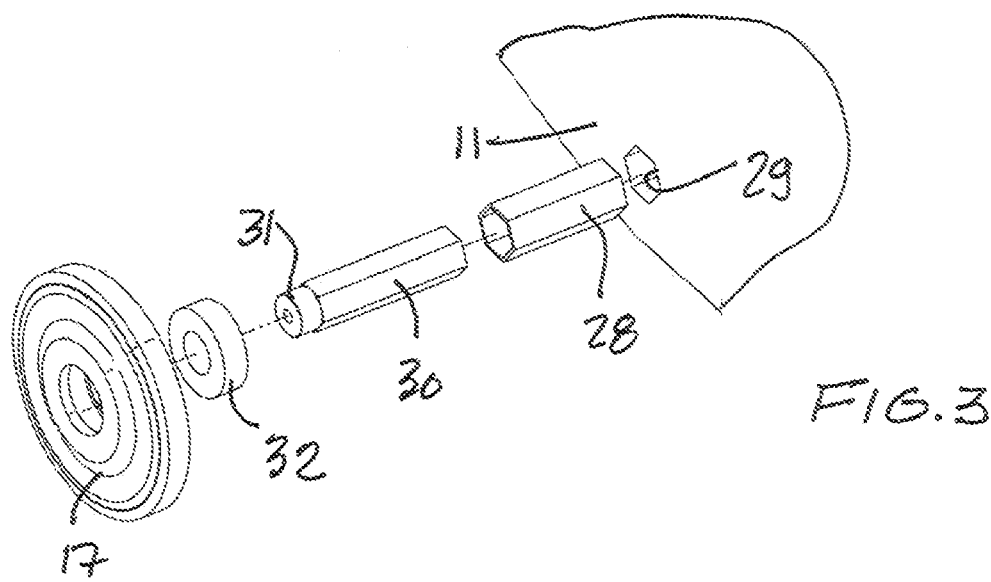
FIG. 3 is an exploded view showing the torsion connection of the support axle of the support wheel.
Figure 4:
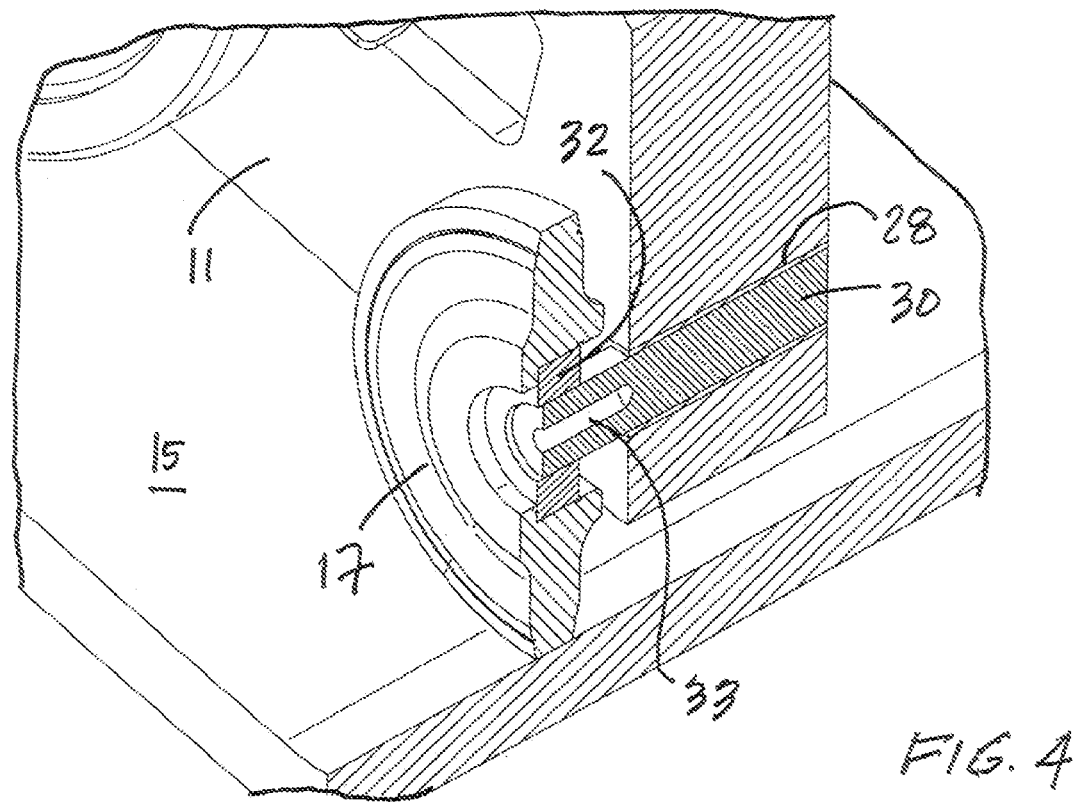
FIG. 4 is a fragmented section view of a support wheel connected to the suspension support beam by the torsion connection.

Referring now to FIG. 3, there is shown the connection of the support wheels 17. They are connected to the support beam 11 by a torsional axle connection constituted by a resilient support sleeve 28 disposed in an axle support bore 29 of the support beam 11. The resilient support sleeve 28 may be a rubber support sleeve. The axle support bore 29 extends along a transverse axis of the support beam. An axle 30 of each of the support wheels 17 is received within the resilient support sleeve 28. In an embodiment, the axle 30 is received in the rubber support sleeve 28 and vulcanized therein. The rubber support sleeve 28 may also be vulcanized within the axle support bore 29. The outer end 31 of the axle is adapted to receive a ball bearing 32 which is press-fitted within the support wheel 17 and about the outer end 31 of the axle. The assembly once secured to the support beam 11 is illustrated in FIG. 4 and as hereinshown the end of the axle 30 is provided with a fastener receiving bore 33 for receiving a fastener (not shown) therein. Although the axle 30 is received in the resilient support sleeve 28, any appropriate connection portion of the support wheel 17 may be connected to the support beam 11 by the resilient support sleeve 28.

Figure 5:
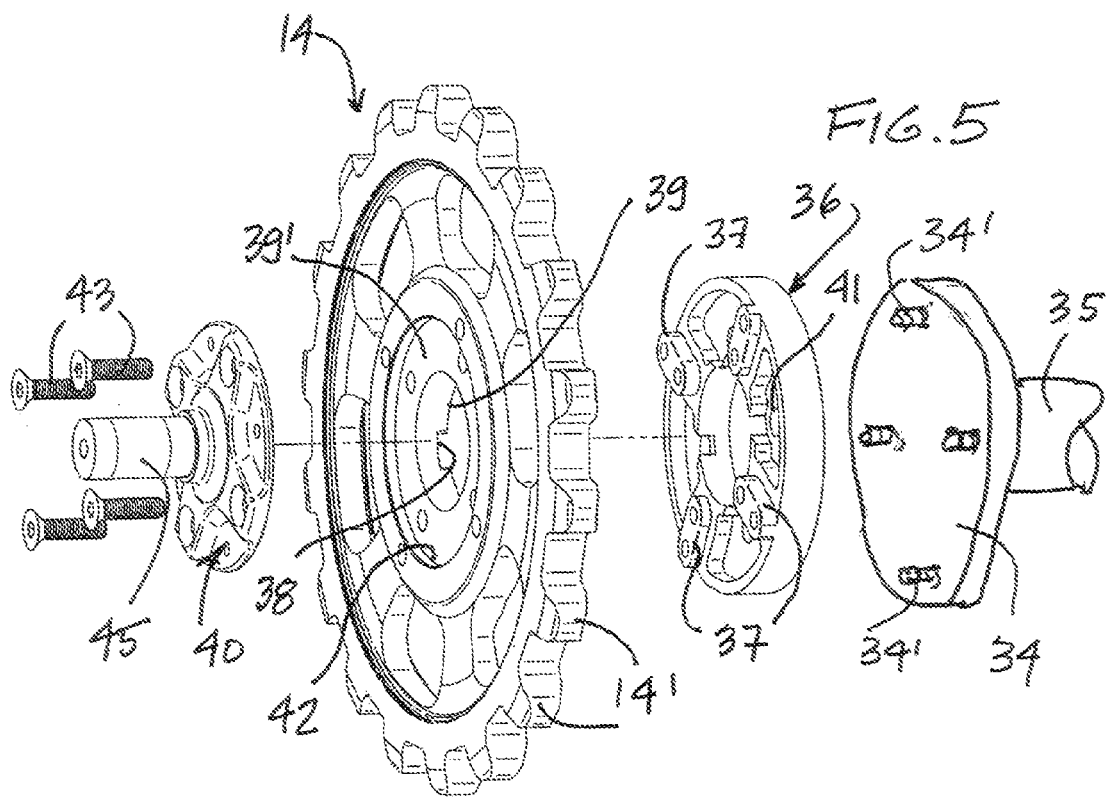
FIG. 5 is an exploded view illustrating the connecting parts of the drive sprocket to a vehicle drive axle.
Figure 6:
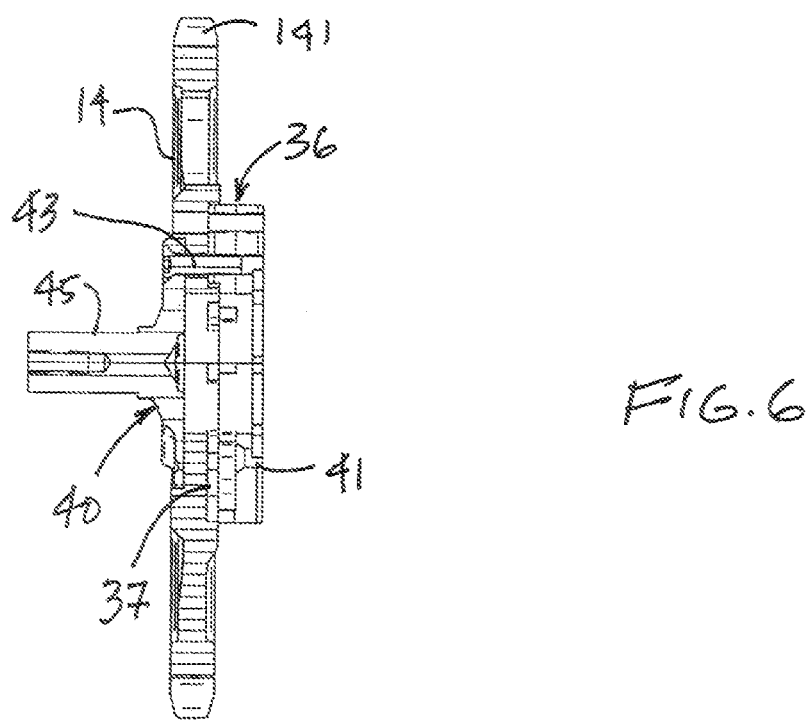
FIG. 6 is a section view showing the adaptor ring secured to the drive sprocket and a clamping cap.

Referring now to FIGS. 5 and 6, there is shown the construction of the drive sprocket 14 and a coupling means for securing same to a connecting end plate 34 of a vehicle drive axle 35. Because these connecting end plates or couplers are different with different vehicle manufacturers or because of different types of vehicles, there is provided an adaptor ring 36 for these different types of couplers, whereby to couple these different types of drive axle connecting end plates 34 to the drive sprocket 14. Accordingly it is not necessary to modify the drive sprocket for coupling same to different types of vehicle drive axles. The only requirement is to provide an adaptor ring suitable for coupling the connecting end plate to the drive sprocket.

As hereinshown the adaptor ring 36 is provided with coupling locking formations 37 which are shaped for close fit reception in coupling cavities 38 provided on a connecting side wall 39 of the drive sprocket. The adaptor ring 36 is secured to projecting threaded bolts 34' of the connecting end plate 34 which are received in holes 41 provided in the adaptor ring. Nuts, not shown, are used to secure the adaptor ring 36 to the bolts 34' of the connecting end plate 34. The drive sprocket is then fitted on the adaptor ring and secured thereto by a connecting cap 40. The connecting cap 40 is secured in a cavity 42 formed in the opposed connecting hub side wall 39'. Securing bolts 43 secure the cap to the adaptor ring through the sprocket. As hereinshown the cap is also provided with a connecting shaft 45 to which the upper end of the support arm 16 is secured.

FIG. 6 shows the assembly of the connecting cap 40, the drive sprocket 14 and the adaptor ring 36 showing the mating of the coupling connecting formation 37 within the cavity 38 and a securement of the cap to the adaptor ring with the sprocket sandwiched therebetween.

Figure 7:
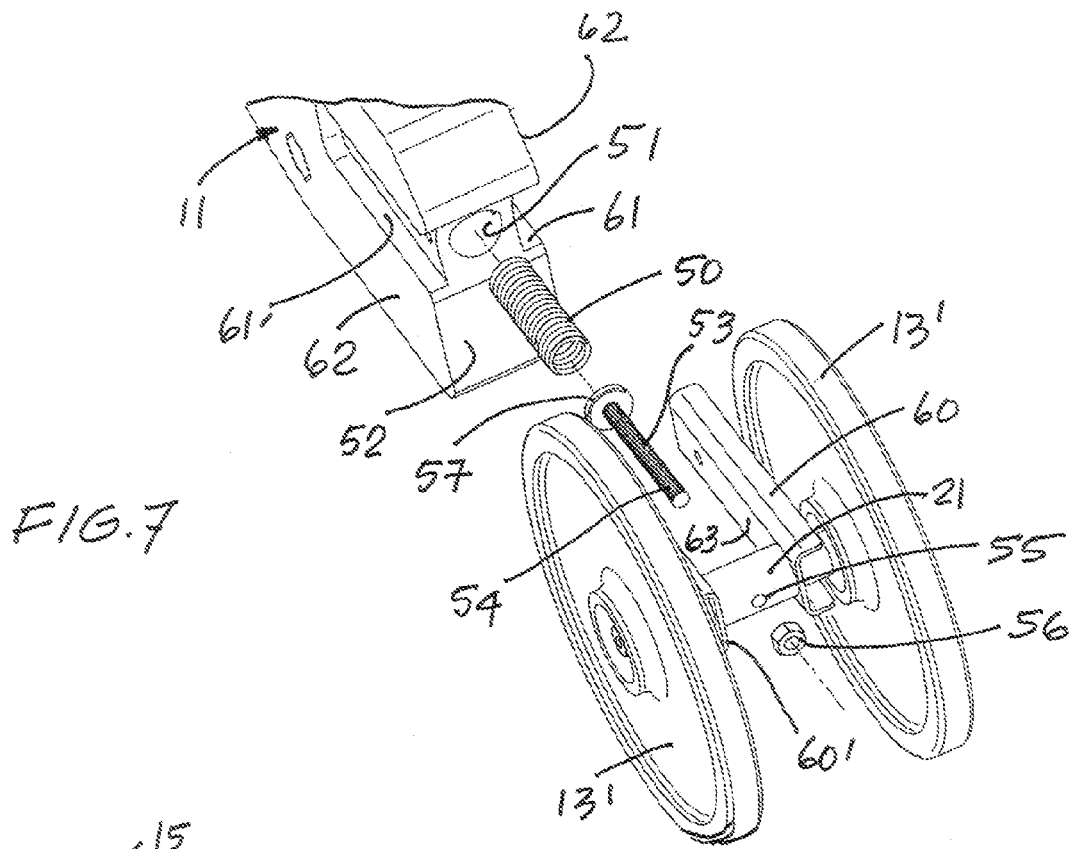
FIG. 7 is an exploded view showing the construction of the track binding mechanism.
Figure 8:
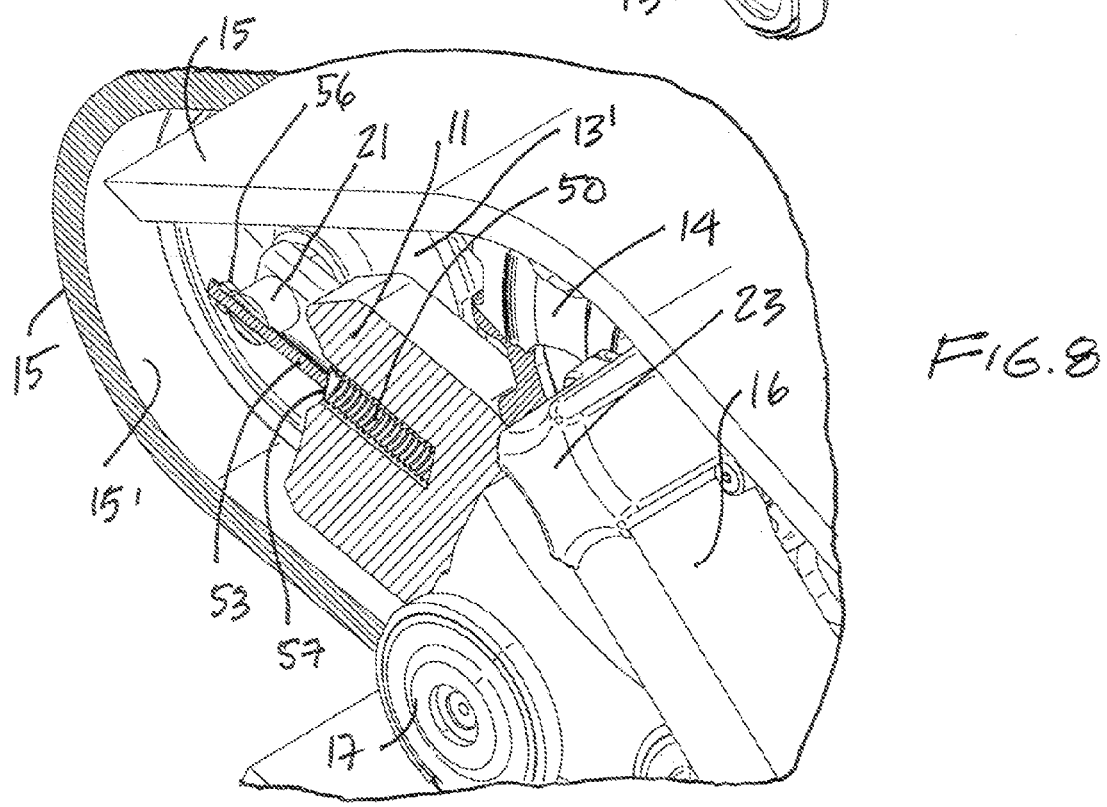
FIG. 8 is a further fragmented section view showing the binding mechanism in an assembled working condition.

Referring now to FIGS. 7 and 8, there will be described the construction of an endless track binding means associated with the adjustable idler wheel 13. This endless track binding means is comprised by a resilient means in the form of a helical spring 50 which is disposed captive in a bore 51 formed in an end wall 52 of the suspension support beam 11. Adjustable compression means is provided in the form of a bolt 53 having at least a threaded end portion 54 which is threadably engaged in a transverse threaded connecting bore 55 formed in the support axle 21 of the adjustable idler wheels 13'. An adjustable nut 56 is threaded about the threaded free end portion 54 of the bolt 53 whereby to displace a plunger head 57 secured to the inner end of the bolt 53 and projectable within the bore 51 in which the helical spring 50 is disposed whereby to compress or decompress the spring 50. The adjustable nut is made accessible from outside the endless track 15 through the sprocket receiving holes 19 formed in the track and which are aligned therewith. By the use of a ratchet-type tool the nut 56 can be rotated whereby to adjust the tension in the spring 50 to provide the proper binding force against the inner side wall 15' of the endless track 15.

FIG. 8 shows the binding assembly in an assembled condition. The binding assembly is further provided with support guide means in the form of slide arms 60 and 60' connected spaced-apart at one end to the support axle 21 and disposed on opposed sides of the bolt 53. These slide arms are slidingly received in a respective one of guide channels 61 and 61', respectively, formed in opposed side walls 62 of the support beam 11, as clearly illustrated in FIG. 7. As hereinshown the slide arms 60, 60' are elongated straight metal arms of U-shaped cross-section having a flat intermediate wall 63 disposed for sliding friction fit in a respective one of the rectangular guide channels 61 and 61'. The slide arms 60, 60' prevent the support axle 21 from rocking motion with respect to the end wall 52 of the support beam 11. Accordingly, the support guide means provides a rigid stable displacement structure when adjusting the binding force.

Figure 9:
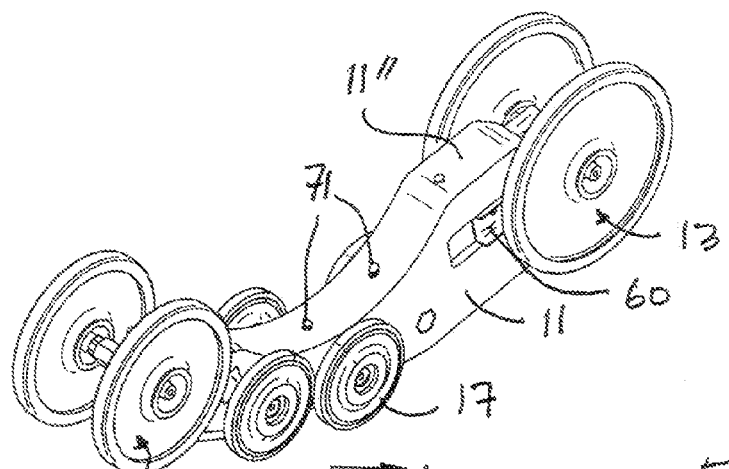
FIG. 9 is a perspective view of the endless track suspension provided with an adjustable slider bar connected to the support beam lower face and adjustable by displacement screws.
Figure 10:
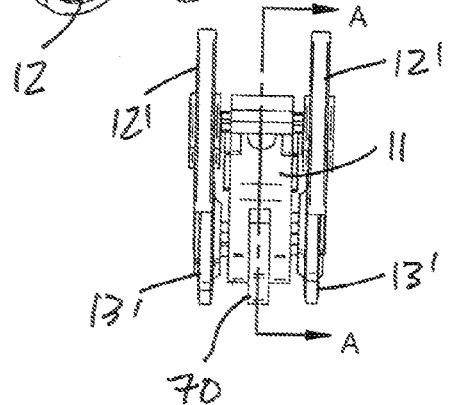
FIG. 10 is a front view of FIG. 9 showing the position of the slider bar with respect to the suspension support beam.
Figure 11:
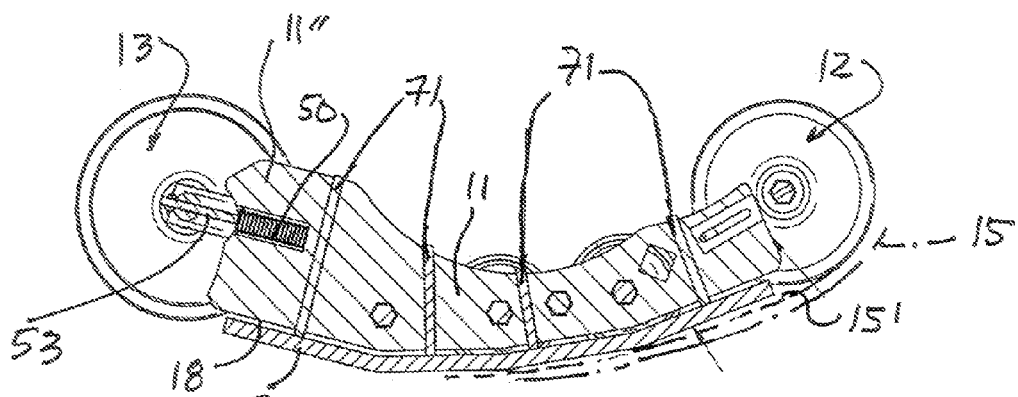
FIG. 11 is a section view along section-lines A-A of FIG. 10 and again illustrating the construction of the slider bar assembly.

Referring now to FIGS. 9 to 11, there is shown an adjustable slider bar 70 secured to the lower surface 18 of the suspension support beam 11. This adjustable slider bar is a narrow bar as illustrated in FIG. 10 and is centrally disposed along the lower surface 18 of the support beam 11 and it is configured to the shape of the lower surface and adjustably connected thereto by adjusting bolts 71 which extend through the support beam 11. By threading the bolts the slider bar can be positioned closer to the inner surface 15' of the endless track 15 whereby to provide better traction of the traction belt over snow surfaces making it easier to turn the vehicle. During non-winter months it can be retracted. These adjustable bolts 71 are easily accessible from opposed sides of the track in the large space provided over the support beam. Also because the support arm 16 is a side arm, it provides easy access to the bolts located adjacent the sprocket wheel from the opposed sides of the support beam, that is to say the side opposed to the torsion pivot connection 22.

As previously described the endless track suspension of the present invention was designed particularly to be coupled to the drive shafts of all terrain vehicles such as four wheel vehicles or vehicles having rear traction wheels and a front steering ski for use on snow. However, it is intended not to restrict the invention to these vehicles as it is conceivable that such suspension can be used on other types of land vehicles for recreational or industrial use.

It is within the ambit of the present invention to cover any obvious modifications of the preferred embodiment described herein provided such modifications fall within the scope of the appended claims.

I claim:

1. An endless track suspension comprising a support beam having idler wheel assemblies connected to a respective opposed ends of said support beam, at least one of said idler wheel assemblies having an endless track binding means, support wheels secured to said support beam and projecting from a lower face of said support beam, a drive sprocket secured above said support beam by a support means, coupling means connectable to said drive sprocket for securing the drive sprocket to a vehicle drive axle, said drive sprocket, support wheels and idler wheel assemblies constituting an endless track support assembly for supporting an endless track in drivable engagement thereabout, a torsion connection between said support beam and at least one of said support wheels, said torsion connection having a resilient support sleeve disposed in a support bore extending along a transverse axis of said support beam for connecting a connection portion of an associated one of said support wheels.

2. An endless track suspension as claimed in claim 1 further comprising flexible suspension means to absorb shocks, the flexible suspension means being provided by a torsion pivot connection between a lower end of said support means and said support beam.

3. An endless track suspension as claimed in claim 2 wherein said support means is a support arm, said torsion pivot connection being comprised by a connecting transverse hollow metal sleeve secured to said lower end of said support arm, a connecting metal rod secured to said support beam, a rubber sleeve about a free end portion of said connecting metal rod, said free end portion extending into said transverse hollow metal sleeve with said rubber sleeve between said transverse hollow metal sleeve and said connecting metal rod, said rubber sleeve providing limited torsional displacement of said transverse hollow metal sleeve about said connecting metal rod.

4. An endless track suspension as claimed in claim 1 wherein said resilient sleeve is mounted about an outer surface thereof to said support beam and on an inner surface thereof to the connection portion of said support wheel.

5. An endless track suspension as claimed in claim 4 wherein each of said support wheels has a ball bearing fitted about a projecting support end of said connection portion, which is an axle.

6. An endless track suspension as claimed in claim 1 wherein said coupling means comprises an adaptor ring for immovable securement to a connecting end of a vehicle drive axle, said adaptor ring having coupling connecting formations for connection to a connecting hub side wall of said drive sprocket, and a connecting means for securing said drive sprocket to said adaptor ring and providing a connecting shaft for said support means.

7. An endless track suspension as claimed in claim 6 wherein said coupling connecting formations are configured for close fit engagement in coupling cavities formed in said connecting hub side wall.

8. An endless track suspension as claimed in claim 7 wherein said coupling connecting formations further comprise two or more threaded bores in said adaptor ring for receiving connecting bolts extending through connecting bores of said connecting means, said connecting means being a clamping cap fitted about an outer hub side wall of said drive sprocket with said connecting bolts extending through sprocket bores aligned with said threaded bores of said adaptor ring whereby said connecting bolts connect to said adaptor ring with said drive sprocket held captive therebetween.

9. An endless track suspension as claimed in claim 1 wherein said endless track binding means is comprised by a resilient means held captive in a bore of an end wall of said support beam, adjustable compression means displaceably secured to a support axle of at least one of said idler wheels assemblies and having a plunger head disposed against an outer end of said resilient means to compress or decompress the resilient means by said displaceable securement and an outer engageable end to effect said displaceable securement and support guide means to guidingly support said at least one of said idler wheel assemblies adjacent said end wall of said support beam.

10. An endless track suspension as claimed in claim 9 wherein said adjustable compression means is a bolt having a threaded outer portion threadably engaged in a transverse threaded connection bore formed in said support axle.

11. An endless track suspension as claimed in claim 10 wherein a lock nut is adjustably displaceable along said threaded outer portion of said bolt whereby to adjust a compression of said resilient means by modifying a projecting length of said plunger head with respect to said support axle and thereby a compression force of said resilient means when said endless track is disposed about said idler wheel assemblies and drive sprocket.

12. An endless track suspension as claimed in claim 11 wherein said resilient means is a helical spring.

13. An endless track suspension as claimed in claim 9 wherein said support guide means is comprised by a pair of slide arms spaced-apart and connected at one end to said support axle and on opposed sides of said adjustable compression means and slidingly received in respective guide channels formed in opposed side walls of said support beam adjacent said end wall thereof.

14. An endless track suspension as claimed in claim 13 wherein said slide arms are elongated straight metal arms of U-shaped cross-section having a flat intermediate wall disposed for sliding friction fit in a respective one of said guide channels, said slide arms preventing said support axle from rocking motion with respect to said end wall of said support beam.

15. An endless track suspension as claimed in claim 1 wherein there is further provided an adjustable slider bar adjustably secured to a lower surface of said support beam to adjust spacing between a lower face of said slider bar and an inner surface of said endless track.

16. An endless track suspension as claimed in claim 1 wherein said endless track is an endless rubber belt having a plurality of sprocket engaging holes about a central longitudinal axis thereof and equidistantly spaced apart to receive sprocket teeth of said drive sprocket therein.

17. An endless track suspension as claimed in claim 1 wherein each of said idler wheel assemblies is comprised by a pair of wheels secured to a respective opposed ends of said connection portion, which is a support axle.

18. An endless track suspension as claimed in claim 17 wherein said support wheels are secured to opposed sides of said support beam.

19. An endless track suspension as claimed in claim 1, wherein the connection portion of the support wheel is an axle of said support wheel connected to the support beam by said torsion connection.

\* \* \* \* \*